Patented Mar. 2, 1943

2,312,901

UNITED STATES PATENT OFFICE 2,312,901

PROCESS OF PREPARING GONADOTROPIC PITUITARY HORMONES

Max Hartmann, Riehen, and Fritz Benz, Allschwil, Switzerland, assignors to Ciba Pharmaceutical Products, Incorporated, Summit, N. J.

No Drawing. Application January 22, 1941, Serial No. 375,539. In Switzerland January 18, 1940

3 Claims. (Cl. 167—74)

It has been found that the well-known acid precipitants used in protein chemistry to remove protein matter from organic extracts, etc., behave in different ways towards the active gonadotropic substances obtained from the pituitary gland. Although the latter substances are of a protein nature they are not precipitated from their solutions, e. g. from aqueous organic extracts, by such substances as sulfosalicylic acid and trichloracetic acid. Compounds of the polynitrophenol type such as picric acid produce on the other hand complete precipitation.

The subject of the present invention is a process for the manufacture of gonadotropic pituitary hormones which is characterised by the fact that the solutions containing these hormones are treated with strongly acid protein precipitants, e. g. sulfosalicylic acid or trichloracetic acid, the inactive precipitate separated from the acid hormone solution, then the excess of acid is removed and the active gonadotropic substance precipitated from the solution thus obtained by the addition of a substance of the polynitrophenol type and from the precipitate the active substance is then separated in known manner.

Any solution containing pituitary hormone obtained, for example, from horse pituitary glands, sheep pituitary glands and similar extracts can be used as the starting material.

Experience has shown that inactive protein substances are precipitated by means of strongly acid protein precipitants, e. g. sulfosalicylic acid or trichloracetic acid. The temperature of the hormone solutions is kept as low as possible by continual cooling, in order to prevent decomposition of the active substances in the liquid, which becomes strongly acid. The voluminous precipitate, which has brought down with it all coloured components, contains, at the most, traces of active substance in the adsorbed form. These residual portions can easily be brought into solution by repeated precipitation. After the collected solutions have been freed from precipitate, the acid is removed by neutralisation, dialysis or some similar method, and the active substances then precipitated by means of a substance of the polynitrophenol type (e. g. picric or picrolonic acid). This precipitation should also be carried out under continual cooling and stirring, preferably using a saturated aqueous solution of the precipitant in such a quantity as is just sufficient to produce complete precipitation. The yellowish precipitate obtained in this way contains all the gonadotropically active substances. By filtration or centrifuging, it is separated off from the inactive liquid which has a pronounced Molisch reaction. The active substances are separated from the precipitate by a precipitant in the known way. This can be done by extracting, washing or by dialysis. The picric acid, for example, is removed by dissolving in acetone or by dialysis of an alkaline solution of the precipitate. The end product obtained in this way is a white powder which is readily soluble in water and contains almost the entire quantity of gonadotropic active substance which was present in the original extract. Its weight is only a fraction of the weight of extract originally used.

The process previously used for the concentration of gonadotropic pituitary hormones, such as precipitation of the active principles from aqueous extracts with miscible organic solutions, fractional salting out with ammonium sulfate and similar salts, isoelectric precipitation of extraneous matter and the various adsorption methods yield hormone preparations which still contain a large percentage of unwanted impurities. These ballast substances which consist mainly of proteins and mucoids of high molecular weight can only be removed by a repetition and combination of these methods and then only partly and with considerable loss of active substance: They are the essential cause of several factors which limit the sphere of use of the gonadotropic hormone. The dry preparations become partly insoluble after long standing through denaturisation of such high molecular proteins and in aqueous solutions, turbidity and flocculation often occur after a short time.

This process is free from these disadvantages. In fact it leads, in two stages which can be simply carried out, to largely purified products without any, or with very little, loss of active substance. The process is suitable not only for crude extracts but, in particular, for the further purification of gonadotropic pituitary preparations which have been partially purified by the known methods. In each case preparations of great purity and efficacy are obtained which are extremely easily soluble in water and cannot be coagulated even by boiling in aqueous solution. Such gonadotropic hormone preparations produce, even when administered in very small quantities, pronounced folliculinisation and luteinisation of the ovaries in infantile rats and mice. They produce, however, no effect on the thyroid gland of the guinea pig and the thyroid gland of pigeons even in high doses. They are therefore free from thyreotropic and lactogenic hormone.

*Example 1*

10.0 g. of dry powder of an extract of horse pituitary, which has been partially purified by precipitation with alcohol and dialysis, are dissolved in 500 cc. of water. The hormone solution is cooled with ice and 125 cc. of a 10% aqueous solution of sulfosalicylic acid allowed to flow in drop by drop within 15 minutes, stirring continually. This quantity is just sufficient to produce complete precipitation. The strongly acid mixture (pH 1.45) is stirred a few minutes longer under continual cooling and then centrifuged for a short time in a cooled centrifuge. The supernatant solution, which contains the active substance, is clear and only pale coloured. It must be neutralised as soon as possible. The sulfosalicylic acid precipitate only contains small quantities of active substance which are adsorbed during the precipitation process. It is dissolved therefore in weak ammonia water, the solution neutralised with dilute hydrochloric acid and made up to 300 cc. 75 cc. of sulfosalicylic acid solution are added as described to this solution. The liquid which has been separated from the precipitate is neutralised and, together with the main solution, freed from salts by dialysis and subsequently evaporated to dryness in vacuo. The residue (2.25 g.) is a pale powder which is easily soluble in water and possesses nearly the same gonadotropic activity as the pituitary extract from which it is prepared. The sulfosalicylic acid precipitate is inactive even after the precipitant has been separated off.

1.0 g. of the active dry preparation is dissolved in 100 cc. of water. 34 cc. of a saturated (at room temperature) solution of picric acid are added drop by drop to the cooled hormone solution, stirring vigorously and the precipitate obtained separated off by centrifuging. It is then washed several times with acetone, dissolved in a little water and the solution dialysed for two days against distilled water which is continually renewed. In this way the picric acid is completely removed. The solution is evaporated down in vacuo; a white powder remains (0.35 g.) which easily dissolves again in water and possesses the full gonadotropic activity of the starting material. Its activity, however, is about 20 times that of the original dry extract.

Example 2

250 cc. of an aqueous extract of sheep pituitary which has been dialysed until free from salt and has been shown on the juvenile rat to have a gonadotropic activity of 10 units per cc. (0.02 g. of dry residue per cc.) are taken and 70 cc. of a 10% solution of sulfosalicylic acid are added under the same conditions are prescribed in Example 1. The mixture is further treated as described in this example. 1.05 g. of dry preparation are obtained from the end solution, which has been freed from sulfosalicylic acid. Its biological activity (follicular stimulation, luteinisation) is estimated at 2500 R. U./g.

1.0 g. of this dry preparation is dissolved in 50 cc. of water and 22 cc. of saturated aqueous solution of picric acid allowed to drop slowly into the ice-cooled liquid under vigorous stirring. The precipitate formed is collected on a Büchner funnel after having allowed to stand for a short time, washed several times with cold acetone, then dissolved in a little water, 10 times the quantity of cold acetone added and the whole allowed to stand for a few hours in a refrigerator. The fine grained precipitate is then centrifuged, washed and dried with acetone and ether. The precipitate thus obtained is a white powder which is easily soluble in water (0.45 g.) and has a gonadotropic activity of 5000 R. U./g.

Example 3

150 cc. of a cooled aqueous extract of horse pituitary, which contains 0.02 g. of non-dialysable dry extract per cc. and whose residue has a gonadotropic activity of about one R. U./mg. when estimated on 21 day old female rats, is taken and 20% trichloracetic acid allowed to flow in under vigorous stirring, until a sample quantity which has been centrifuged off remains clear on the addition of more precipitant. A total quantity of 21.5 cc. of trichloracetic acid reagent is required.

The voluminous white precipitate is centrifuged off after standing for a short time, suspended in 20 cc. of cold 3% trichloracetic acid and the washings, which are clarified by centrifuging, added to the main solution. This is neutralised with concentrated ammonia and 1.5 g. of finely powdered picric acid added in small portions to the well stirred and cooled liquid. A dense yellow precipitate soon forms which after standing for one hour in the refrigerator is centrifuged off and freed from adhering picric acid by repeatedly extracting with acetone. The residual white powder again dissolves easily and completely in water. Yield 0.14 g. of about 20 R. U./mg.

Example 4

1.0 g. of a dry gonadotropic preparation obtained from horse pituitary by treatment with sulfosalicylic acid (c. f. Example 1) is dissolved in 80 cc. of distilled water. 53 cc. of a saturated (at room temperature) aqueous solution of picrolonic acid are allowed to drop into the cooled and well stirred hormone solution over a period of 20 minutes. The suspension is again stirred for half an hour and the yellow precipitate separated off by centrifuging. The moist mass can easily be freed from picrolonic acid by repeatedly treating with acetone. The dry residue is a pure white powder (0.55 g.) containing about 50 R. U./mg.

What we claim is:

1. The process for the preparation of gonadotropic pituitary hormones which comprises treating a solution containing the said hormones with a strongly acid protein precipitant, separating the resultant inactive precipitate from the acid hormone solution, neutralizing the excess of acid in the latter, precipitating the active gonadotropic substance from the resultant solution by the addition thereto of a substance of the polynitrophenol type, and separating the active substance from the resultant precipitate.

2. The process for the preparation of gonadotropic pituitary hormones which comprises treating a solution containing the said hormones with sulfo-salicylic acid, separating the resultant inactive precipitate from the acid hormone solution, neutralizing the excess of acid in the latter, precipitating the active gonadotropic substance from the resultant solution by the addition thereto of picric acid, and separating the active substance from the resultant precipitate.

3. The process for the preparation of gonadotropic pituitary hormones which comprises treating a solution containing the said hormones wtih sulfo-salicylic acid, separating the resultant inactive precipitate from the acid hormone solution, neutralizing the excess of acid in the latter, precipitating the active gonadotropic substance from the resultant solution by the addition thereto of picrolonic acid, and separating the active substance from the resultant precipitate.

MAX HARTMANN.
FRITZ BENZ.